US012638544B2

(12) United States Patent
Pandharipande et al.

(10) Patent No.: US 12,638,544 B2
(45) Date of Patent: May 26, 2026

(54) INTERFERENCE SENSING AND ADAPTATION

(71) Applicant: NXP B.V., Eindhoven (NL)

(72) Inventors: Ashish Pandharipande, Eindhoven (NL); Alessio Filippi, Eindhoven (NL)

(73) Assignee: NXP B.V., Eindhoven (NL)

( * ) Notice: Subject to any disclaimer, the term of this patent is extended or adjusted under 35 U.S.C. 154(b) by 274 days.

(21) Appl. No.: 18/545,451

(22) Filed: Dec. 19, 2023

(65) Prior Publication Data

US 2025/0199112 A1 Jun. 19, 2025

(51) Int. Cl.
  *G01S 7/02* (2006.01)
  *G01S 7/35* (2006.01)
  *G01S 13/931* (2020.01)

(52) U.S. Cl.
  CPC ................ *G01S 7/023* (2013.01); *G01S 7/35* (2013.01); *G01S 13/931* (2013.01)

(58) Field of Classification Search
  CPC .......... G01S 7/023; G01S 7/35; G01S 13/931; G01S 7/354; H04B 2001/6912
  USPC ........................................................ 342/175
  See application file for complete search history.

(56) References Cited

U.S. PATENT DOCUMENTS 6,940,893 B1 * 9/2005 Pinkney ................... H04B 1/69
                                                              370/441
7,110,432 B2 * 9/2006 Hooton .................... H04B 1/69
                                                              375/150

7,187,321 B2 * 3/2007 Watanabe ............. G01S 13/345
                                                              342/91
7,787,514 B2 * 8/2010 Shattil ................. H04L 27/2631
                                                              375/130
10,855,328 B1 * 12/2020 Gulati .................. H04B 1/7103
11,280,879 B2 * 3/2022 Hong .................... G01S 13/343

(Continued)

FOREIGN PATENT DOCUMENTS

EP        1912080 A2 * 4/2008 ............. G01S 7/032
EP        2876460 A1 * 5/2015 ........... G01S 13/343

(Continued)

OTHER PUBLICATIONS

Borngraber, F. et al., "IMIKO Radar—Minimizing Interference Through Cooperation at Radar Sensors for Autonomous Electric Vehicles", May 2022, 54 pages.ce and Electronic Systems, vol. 53, No. 1; Feb. 2017; pp. 334-344.

(Continued)

*Primary Examiner* — Nuzhat Pervin

(57) ABSTRACT

Techniques, methods, and systems are provided for interference sensing and adaptation in echolocation applications. An echolocation system transmits a series of chirp signals in a first portion of a transmission period based on a first set of chirp transmission parameters. Subsequently, the echolocation system identifies external sources of echolocation frequency transmissions during a non-transmitting portion of the transmission period. Based on characteristics of those identified external sources and echolocation frequency transmissions, a modified set of chirp transmission parameters is generated to mitigate the effects of the detected interference. A modified series of chirp signals is transmitted during a subsequent transmission period based on the modified set of chirp transmission parameters.

20 Claims, 5 Drawing Sheets

(56)                    References Cited

U.S. PATENT DOCUMENTS

| | | | | |
|---|---|---|---|---|
| 11,353,549 | B2 * | 6/2022 | Jansen | G01S 13/931 |
| 11,740,345 | B2 * | 8/2023 | Narayana Moorthy | G01S 13/343 |
| | | | | 342/112 |
| 11,789,114 | B2 * | 10/2023 | Roger | G01S 13/347 |
| | | | | 342/112 |
| 11,906,614 | B2 * | 2/2024 | Peng | G01S 13/878 |
| 12,169,248 | B2 * | 12/2024 | Hong | G01S 7/0232 |
| 12,265,149 | B2 * | 4/2025 | Subburaj | G01S 13/42 |
| 2003/0133496 | A1 * | 7/2003 | Hooton | H04B 1/69 |
| | | | | 375/259 |
| 2003/0156624 | A1 * | 8/2003 | Koslar | H04B 1/69 |
| | | | | 375/295 |
| 2004/0100897 | A1 * | 5/2004 | Shattil | H04L 27/2631 |
| | | | | 370/206 |
| 2005/0226312 | A1 * | 10/2005 | Koslar | H04B 1/69 |
| | | | | 375/150 |
| 2008/0310479 | A1 * | 12/2008 | Koslar | H04W 52/267 |
| | | | | 375/295 |
| 2014/0354470 | A1 * | 12/2014 | Kuo | G01S 7/0232 |
| | | | | 342/385 |
| 2016/0146933 | A1 * | 5/2016 | Rao | G01S 13/34 |
| | | | | 342/132 |
| 2018/0011180 | A1 * | 1/2018 | Warnick | H01Q 21/064 |
| 2018/0095162 | A1 * | 4/2018 | Fetterman | G01S 7/023 |
| 2019/0056478 | A1 * | 2/2019 | Millar | H04B 1/69 |
| 2019/0129003 | A1 * | 5/2019 | Longman | G01S 7/35 |
| 2019/0293749 | A1 * | 9/2019 | Itkin | G01S 13/931 |
| 2020/0025865 | A1 * | 1/2020 | Gulati | G01S 13/42 |
| 2020/0028656 | A1 * | 1/2020 | Gulati | G01S 7/0232 |
| 2020/0049812 | A1 * | 2/2020 | Jansen | G01S 13/343 |
| 2020/0057136 | A1 * | 2/2020 | Doescher | G01S 13/584 |
| 2020/0072941 | A1 * | 3/2020 | Jansen | G01S 13/345 |
| 2020/0124699 | A1 * | 4/2020 | Meissner | G01S 13/0209 |
| 2020/0284874 | A1 * | 9/2020 | Narayana Moorthy | G01S 13/343 |
| 2020/0408891 | A1 * | 12/2020 | Brett | G01S 13/345 |
| 2021/0011119 | A1 * | 1/2021 | Bialer | G01S 13/343 |
| 2021/0389416 | A1 * | 12/2021 | Hong | G01S 7/0235 |
| 2022/0099794 | A1 * | 3/2022 | Falkenberg | G01S 13/06 |
| 2022/0120886 | A1 * | 4/2022 | Rao | G01S 13/34 |
| 2022/0163621 | A1 * | 5/2022 | Hong | G01S 13/02 |
| 2022/0276336 | A1 * | 9/2022 | Zhang | G01S 7/021 |
| 2023/0221431 | A1 * | 7/2023 | Bai | G01S 13/42 |
| | | | | 342/200 |
| 2024/0272278 | A1 * | 8/2024 | Jadidian | G01S 7/411 |
| 2024/0295649 | A1 * | 9/2024 | Rao | G01S 13/34 |

FOREIGN PATENT DOCUMENTS

| | | | | | |
|---|---|---|---|---|---|
| EP | 3056920 | A1 * | 8/2016 | | G01S 13/931 |
| EP | 3306339 | A1 * | 4/2018 | | G01S 13/343 |
| EP | 3444628 | A1 | 2/2019 | | |
| EP | 3832350 | A1 * | 6/2021 | | G01S 13/931 |
| EP | 3779508 | B1 | 12/2022 | | |
| EP | 3292424 | B1 * | 11/2023 | | G01S 13/343 |
| EP | 3477331 | B1 * | 9/2024 | | G06N 3/044 |
| JP | 2003506961 | A * | 2/2003 | | H04W 52/265 |
| KR | 20020019977 | A * | 3/2002 | | H04W 52/267 |
| WO | WO-2021003500 | A1 * | 1/2021 | | H04B 7/0478 |
| WO | 2021028482 | A1 | 2/2021 | | |
| WO | 2021165262 | A1 | 8/2021 | | |

OTHER PUBLICATIONS

Erdogan, A. Y. et al., "FMCW Signal Detection and Parameter Extraction by Cross Wigner-Hough Transform," IEEE Transactions on Aerospace and Electronic Systems, vol. 53, No. 1; Feb. 2017; pp. 334-344.

Laghezza, F. et al., "Enhanced Interference Detection Method in Automotive FMCW Radar Systems," 20th International Radar Symposium (IRS), Ulm, Germany, 2019, pp. 1-7.

Neemat, S. et al., "An Interference Mitigation Technique for FMCW Radar Using Beat-Frequencies Interpolation in the STFT Domain," in IEEE Transactions on Microwave Theory and Techniques, vol. 67, No. 3, pp. 1207-1220, Mar. 2019.

* cited by examiner

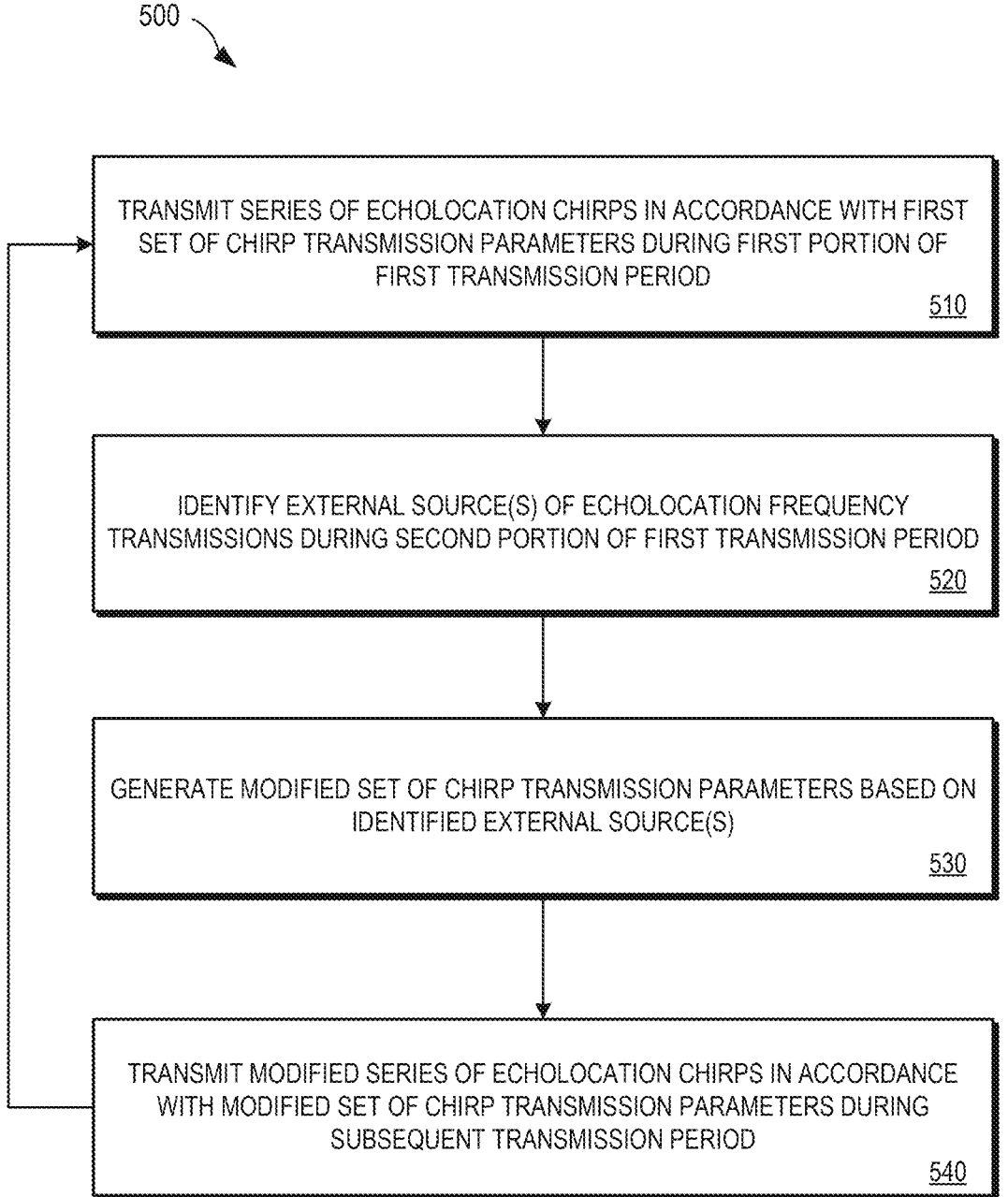

500

TRANSMIT SERIES OF ECHOLOCATION CHIRPS IN ACCORDANCE WITH FIRST SET OF CHIRP TRANSMISSION PARAMETERS DURING FIRST PORTION OF FIRST TRANSMISSION PERIOD

510

IDENTIFY EXTERNAL SOURCE(S) OF ECHOLOCATION FREQUENCY TRANSMISSIONS DURING SECOND PORTION OF FIRST TRANSMISSION PERIOD

520

GENERATE MODIFIED SET OF CHIRP TRANSMISSION PARAMETERS BASED ON IDENTIFIED EXTERNAL SOURCE(S)

530

TRANSMIT MODIFIED SERIES OF ECHOLOCATION CHIRPS IN ACCORDANCE WITH MODIFIED SET OF CHIRP TRANSMISSION PARAMETERS DURING SUBSEQUENT TRANSMISSION PERIOD

INTERFERENCE SENSING AND ADAPTATION

BACKGROUND

Radar systems are used in a variety of devices to detect and identify objects and determine information about the objects such as their range, velocity, direction, or material. For example, some automobiles rely on radar to detect information about nearby objects, and thereby support autonomous driving or other driver assistance functions. To detect information about the nearby objects, a radar system typically transmits a signal via one or more transmitters, receives one or more reflected signals (that is, signals generated by reflections of the transmitted signal caused by the objects) at one or more receivers, and analyzes the received signals to determine the range, velocity and other information about the objects.

In certain scenarios, a radar system can be impacted by inter-radar interference, or by a spoofing attack, in which a transmitted signal from another radar system interferes with the reception and analysis of the reflected signals. This interference can cause, for example, the misidentification or misdetection of objects in the proximity of the radar system as the system struggles to differentiate between signals reflected from objects and those from other radar systems. Such problems may occur more frequently in dense traffic environments, in which multiple vehicles equipped with radar systems operate in close proximity.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 illustrates an operational routine for a radar system configured in accordance with some embodiments.

DETAILED DESCRIPTION

Figure 1:
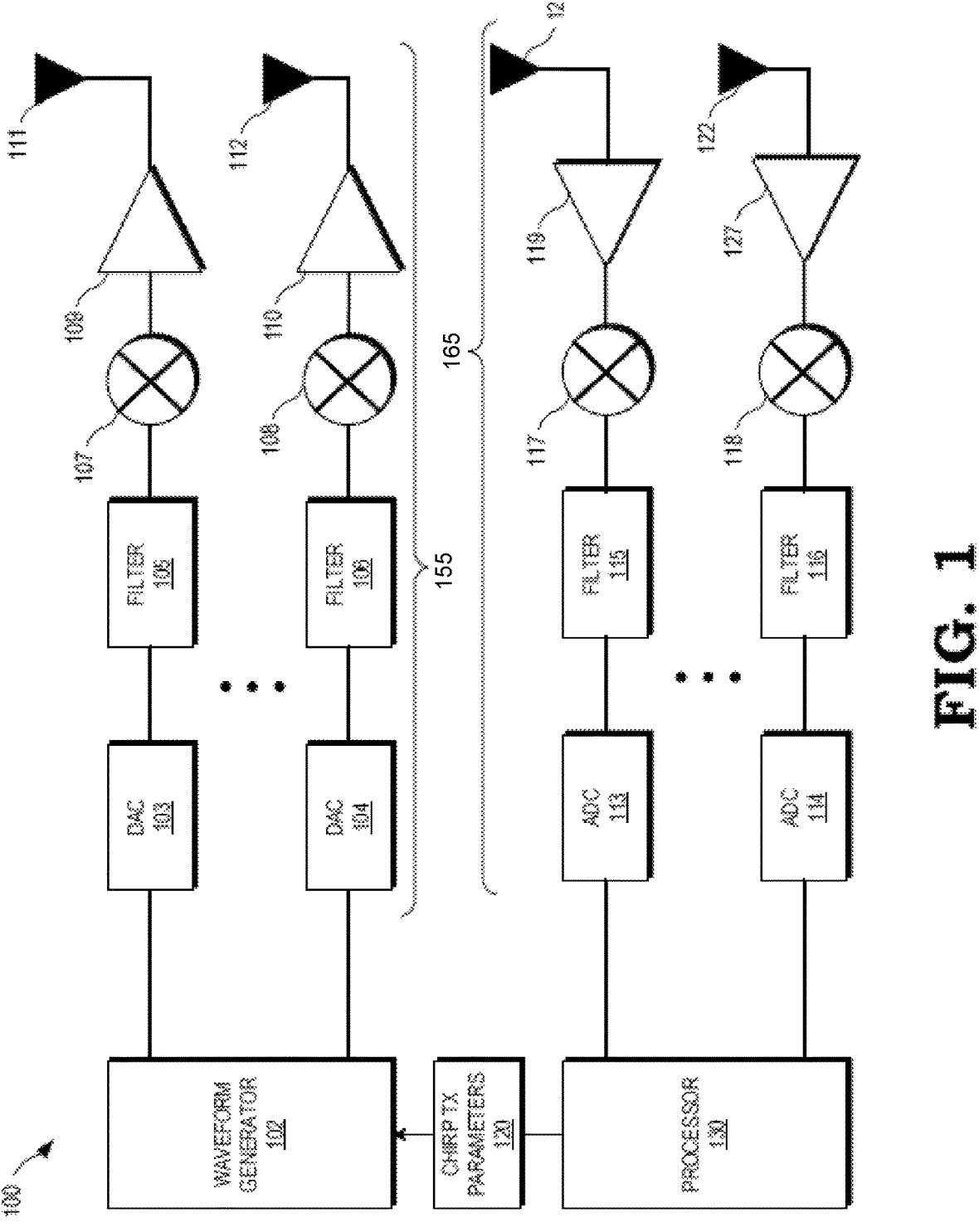
FIG. 1 illustrates a radar system 100 in accordance with some embodiments.

Embodiments of techniques described herein operate in automotive and other systems to assess and respond to a radar signal environment by dynamically adapting radar transmissions based on external radar interference sensing. In certain embodiments, a radar system configured in accordance with techniques described herein utilizes a quiet period between its own recurring series of periodic radar burst transmissions, commonly termed chirps—to sense and process external radar signals, as well as to dynamically modify its chirp transmission parameters in order to mitigate the effects of interference from those external radar signals. In some embodiments, the system scans the radar environment using narrow beam signal patterns to detect external radar signals from one or more selected directions.

In certain embodiments, based on these detections of external radar signals, the radar system creates an interference map and/or estimates various parameters of the interfering signals, such as chirp rate and direction. During one or more subsequent transmission cycles, the radar system adapts its own chirp transmission parameters (e.g., frequency, rate, and transmission power) to mitigate the impact of detected external interference. This dynamic adaptation improves radar performance, particularly in environments with multiple radar-equipped vehicles, reducing the likelihood of interference-induced errors and improving the accuracy of object detection.

As used herein, a chirp signal (or simply chirp) refers to a type of signal (e.g., radar or sonar signal) that is transmitted in order to identify and/or locate, based on characteristics of the resulting reflected signals, one or more objects in varying degrees of physical proximity to the transmitter of the chirp signal. Typically, such chirp signals are modulated to vary in frequency over time, such that by analyzing the frequency shift and time delay of a returned chirp reflected from an object, the echolocation system can calculate various parameters of that object, such as range and relative velocity. It will be appreciated that while certain examples are discussed herein with specific reference to radar signals, various embodiments of techniques described herein are used in additional echolocation contexts. As such, any specific discussion herein of radar signals and radar systems are, unless clearly contraindicated, applicable to other echolocation contexts as well.

In some embodiments, a radar system configured in accordance with the described techniques includes a set of transmitters and receivers adapted for interference sensing and adaptive transmission. During a chirp processing period, the system employs its receivers to scan for external radar signals, using a sequence of narrow beam patterns to cover the region of interest. In certain embodiments, the system conducts such scanning using a lower power level to sense external signals while limiting contribution to the overall radar signal environment. Upon detecting external radar signals, the system processes these signals to determine their characteristics, such as frequency, modulation, and direction. Utilizing this information, the radar system then adapts its own transmission parameters in substantially real time. In certain embodiments, such adaptation includes one or more of a group that includes altering chirp sequences, adjusting power levels, or potentially shifting operational frequencies to minimize the effects of external radar interference.

FIG. 1 illustrates a radar system 100 in accordance with some embodiments. As described further below, the radar system 100 is generally configured to detect objects within proximity of a device that includes the radar system 100 and, at least in some embodiments, is configured to determine characteristics of the detected objects, such as position information (e.g., directional information, range information), radial velocity information, and the like. For purposes of description, it is assumed that the radar system 100 is employed as a component of an automobile (e.g., to support an autonomous driving system), but it will be appreciated that in other embodiments the radar system is employed as a component of any device that employs radar to detect objects.

To support the detection of objects, the radar system 100 employs a waveform generator 102, a set of transmit and receiver channels (described in more detail below), and a processor 130. In some embodiments, the waveform generator 102 is a digital waveform generator including a set of circuits configured to generate specified sequences of digital values that collectively form digital signals for conversion to an analog signal and subsequent transmission, as described further below. The specified sequences depend on the type of radar waveform implemented by the radar system 100. The waveform generator 102, in this embodiment, generates digitally modulated waveforms suitable for object detection and for external interference sensing.

For the purposes of description of the example of FIG. 1, it is assumed that the waveform generator 102 generates phase modulated continuous wave (PMCW) waveforms. In other embodiments, the radar system 100 is an orthogonal frequency division multiplexing (OFDM) system, and the waveform generator 102 generates OFDM sequences. In still other embodiments, the radar system 100 is a digitized frequency modulated continuous wave (FMCW) system and the waveform generator 102 generates FMCW sequences. In still other embodiments, the radar system 100 is a frequency modulated continuous wave (FMCW) system whose frequency is modulated in phase (PM-FMCW radar). In yet other embodiments the radar system 100 is an orthogonal time frequency space (OTFS) modulation radar system.

In the depicted embodiment, the radar system 100 includes a set of N transmitter channels 155 and a corresponding set of M receiver channels 165, where N and M are integers. In some embodiments, M and N are different (that is, the radar system 100 includes a different number of transmitter channels 155 and receiver channels 165). For ease of illustration, FIG. 1 representationally depicts only two of the N transmitter channels 155 and two of the N receiver channels 165. Each transmitter channel 155 includes a digital-to-analog converter (DAC) (e.g., DACs 103 and 104), a filter (e.g., filters 105 and 106), a quadrature mixer (e.g., quadrature mixers 107 and 108), an amplifier (e.g., amplifiers 109 and 110), and transmit antennae 111 and 112, which represent a selectable quantity of antennae. In various embodiments, by controlling the phase and amplitude of signals emitted from the transmit antennae 111 and 112, the radar system 100 can form and direct narrow signal beams (often termed pencil beams) in specific directions without necessitating physical movement of the physical antennae.

The DAC of a transmitter channel 155 is a set of circuits configured to receive a digital waveform generated by the waveform generator 102 and to convert the sequence of digital values to an analog signal having characteristics (e.g., amplitude and frequency) governed by the sequence of digital values. The filter of a transmitter channel 155 is a set of circuits configured to filter the analog signal generated by the corresponding DAC to filter out signal components, thereby shaping the frequency spectrum of the analog signal to be within a corresponding frequency range.

The mixer of a transmitter channel 155 is a set of circuits configured to modulate the signal provided by the corresponding filter to a specified carrier frequency fc. The power amplifier of a transmitter channel 155 is a set of circuits configured to amplify the modulated signal provided by the corresponding mixer. In at least some embodiments, the amplifier of a transmitter channel 155 is programmable or modifiable to generate output signals at different power levels. The transmit antenna of a transmitter channel 155 is a transducer that converts the amplified signal generated by the corresponding amplifier to an electromagnetic radar signal and transmits the radar signal over a corresponding medium (e.g., the air). After being transmitted by the transmit antenna, the transmitted radar signal propagates in the environment of the radar system 100 environment and reflects off of one or more nearby objects to generate a reflected signal.

Each receive channel includes a receive antenna (e.g., receive antennae 121 and 122), a low-noise amplifier (e.g., amplifiers 119 and 127), a quadrature mixer (e.g., quadrature mixers 117 and 118), a filter (e.g., filters 115 and 116) and an analog-to-digital converter (ADC) (e.g., ADCs 113 and 114). In some embodiments, each receive channel includes two ADCs in order to sample a complex signal. Furthermore, in some embodiments the receiver channels 165 include other mixers (e.g., non-quadrature mixers). The receive antenna of a receive channel is a transducer that converts a received reflected signal to an electrical signal. In some embodiments, the receiver includes a plurality of receive antennas to support direction of arrival (DoA) calculations of the received reflection of the radar signal. In a manner similar to that described above with respect to the narrow signal beams transmittable via transmit antennae 111 and 112, in certain embodiments the directionality of signals received by the receive antennae 121 and 122 are controlled via the phase and amplitude of the signals received. In this manner, the radar system 100 can selectably control the direction from which it receives and analyzes radar signals.

The amplifier 119 of a receive channel is a set of circuits configured to amplify the signal provided by the corresponding receive antenna. The quadrature mixer of a receive channel is a set of circuits configured to demodulate the signal generated by the corresponding amplifier. In some embodiments, each quadrature mixer of a receive channel demodulates the received signal with analogous quadrature signals as those applied at the quadrature mixer of the corresponding transmitter channel 155 to generate the analog components of the received signal. The ADC of a receive channel is a set of circuits configured to convert the analog components of the signal generated by the corresponding quadrature mixer, thereby generating a digital signal representative of the reflected radar signal.

In some embodiments, the processor 130 is a processor device (e.g., a central processing unit (CPU) or accelerated processing unit (APU)) configured to execute instructions (e.g., applications) to carry out various operations—for example, operations related to interference sensing and management, including to analyze external radar interference characteristics and adapt transmission parameters in real-time to minimize interference effects. In some embodiments, the processor 130 comprises dedicated circuitry designed and configured to perform such operations. For example, in various embodiments the processor 130 comprises a hardcoded circuit (e.g., a corresponding portion of an application specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD)) that performs the operations described herein.

Examples of the operations executed by the processor 130 includes determining, based on reflected radar signals received via the receiver channels 165, characteristics of one or more objects in proximity of the radar system 100, such as relative velocity, range, and direction. In addition, and as discussed in greater detail elsewhere herein, the processor 130 dynamically adjusts chirp transmission parameters to mitigate the interference of external radar signals in coordination with the waveform generator 102 and transmission/reception components. In particular, the processor 130 provides chirp transmission parameters 120 to the waveform generator 102 based at least in part on detected external radar signals. In various embodiments and scenarios, such chirp transmission parameters may include one or more of a chirp rate, frequency range, duration, and power level. The waveform generator 102, utilizing these parameters, generates the corresponding radar signal waveforms to be transmitted. This configuration allows the radar system to adapt its signal characteristics in real-time based on the current operational environment and detected conditions.

In certain embodiments, the processor 130 performs various operations to identify transmission characteristics of one or more potentially interfering signals received from external sources. For example, the receiving antennae 121, 122 capture interference signals, denoted as r (t), from external sources. To accurately identify transmission characteristics of these signals, the processor 130 computes the Wigner distribution of r (t), which provides a time-frequency representation of the interference signal, enabling the processor to, inter alia, distinguish the interference signal from typical object reflections and other background noise. Following the computation of the Wigner distribution, the processor 130 performs integrates the Wigner distribution over predetermined time-frequency lines of interest, such as to focus on specific frequency bands or time intervals in which interference is most likely to impact the radar system's performance. Subsequently, the processor 130 performs threshold detection operations on the integrated data. In certain embodiments, the processor 130 estimates one or more parameters of the interference, such as center frequency and modulation characteristics. In certain embodiments, at least some of the operations described above are performed by the processor 130 with respect to each of multiple selected directions (such as via one or more directionally configured narrow sensing beams).

The dynamic nature of chirp parameter modification by the radar system 100 improves radar performance under varying conditions. For example, in scenarios with high levels of external radar interference, the processor 130 might adjust the chirp rate or frequency range to mitigate the effects of such interference, such as by avoiding chirp transmissions concurrent with those from a detected external source. Similarly, the radar system 100 may determine to adjust chirp duration and power levels in scenarios favoring enhanced resolution or range.

In certain embodiments, the processor 130 configures chirp transmission parameters during a quiet processing period between chirp transmissions. In this period, the system ceases its transmissions to analyze information about external radar signals detected by the radar system 101, such as via narrow sensing beams configured by the processor 130. Such narrow sensing beams are formed and directed via control of the phase and amplitude of signals received by each of receive antennae 121 and 122. By adjusting the phase of the signal at each such antenna, the radar system 100 can direct the sensing beams in specific directions without necessitating physical movement of the antenna array.

Figure 2:
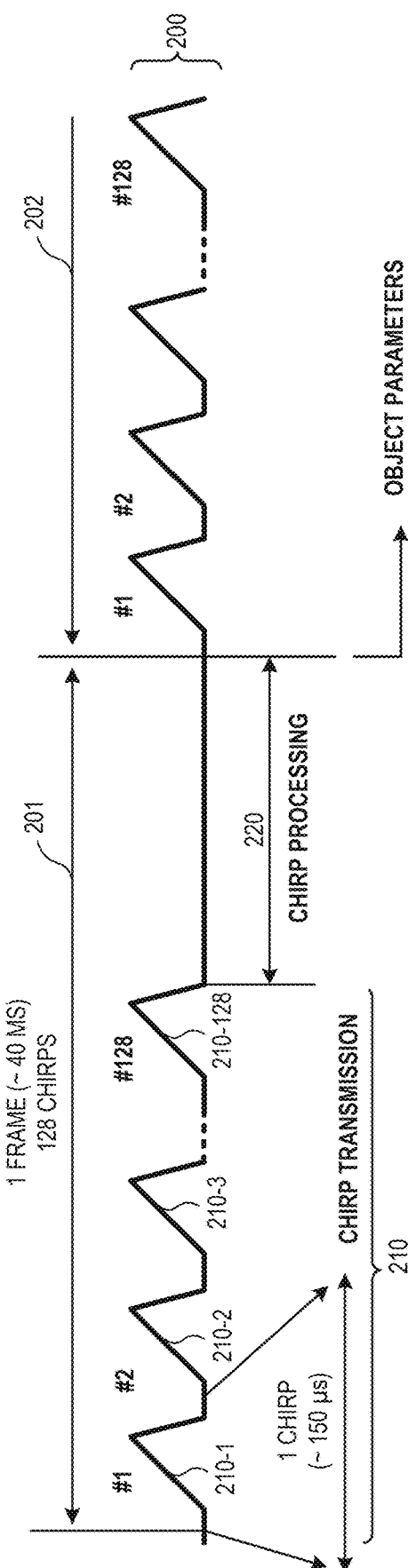
FIG. 2 illustrates a typical periodic chirp waveform 200 used in radar systems for object detection.

FIG. 2 illustrates a typical periodic chirp waveform 200 used in radar systems for object detection. The chirp waveform 200 is employed to detect various parameters (e.g., object velocity, range, and direction) of objects within the proximate radar space.

In the depicted example, a fixed frame period 201 occupies a total duration of approximately 40 ms. Within this frame, a sequence of 128 chirps, corresponding to chirp waveforms 210-1 through 210-128, are transmitted in a chirp transmission period 210, which lasts approximately 20 ms, with each chirp taking approximately 150 μs. Following the chirp transmission period 210, the chirp waveform 200 enters a chirp processing period 220 for the remaining duration of frame period 201, in which the radar system processes the received chirp signals reflected from external objects. Following the frame period 201, the chirp pattern waveform 200 continues in a static manner (beginning with successive frame period 202) to keep analyzing parameters of objects proximate to the radar system in real time.

However, this conventional approach encounters significant complications in environments with prevalent external radar interference. As the adoption of radar systems has become more widespread, particularly in automotive applications, the likelihood of encountering external radar signals that interfere with radar system operations has increased. For example, such interference may cause signal confusion, in which external radar chirps are mistakenly interpreted by the radar system as its own reflected signals; reduced sensitivity, in which external radar signals partially or totally obscure reflections from other objects in the radar space; and data corruption, such as when strong external radar signals corrupt data acquired during the chirp processing period 220. Each of these, alone or in combination, can lead to errors in calculating object characteristics, potentially causing the radar system to misinterpret the velocity, range, or direction of objects, or fail to detect them altogether.

Figure 3:
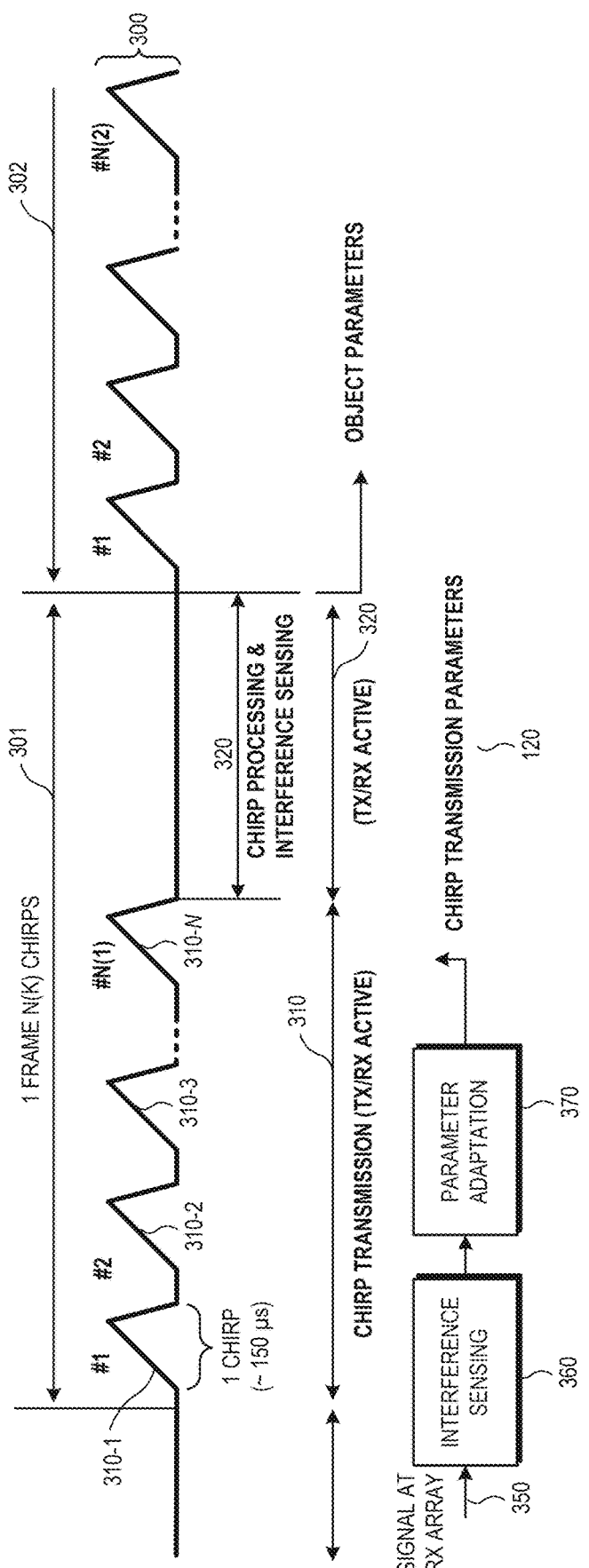
FIG. 3 illustrates a periodic chirp waveform 300 in accordance with some embodiments.

FIG. 3 illustrates a periodic chirp waveform 300 in accordance with some embodiments. As with chirp waveform 200 of FIG. 2, the chirp waveform 300 is employed to detect various parameters of objects within the proximate radar space. However, in contrast with the fixed ~40 ms duration of frame period 201, the duration of the frame period 301 is dynamically selectable by the radar system. Within this frame period 301, a sequence of N chirps, corresponding to chirp waveforms 310-1 through 310-N, are transmitted in a chirp transmission period 310, which lasts approximately (N×150 μs, where each chirp lasts approximately 150 μs). In contrast with the chirp waveform 200 and as discussed in greater detail below, here the radar system 100 dynamically modifies various chirp transmission parameters, such as a quantity of transmitted chirps N and the interval between them, based on the external radar environment, allowing for optimized object detection and reduced interference impact.

Following the chirp transmission period 310, the chirp waveform 300 enters a chirp processing and interference sensing (CPIS) period 320 for the remaining duration of frame period 301. During the CPIS period 320, the radar system 100 not only processes the received chirp signals reflected from external objects, but also engages in active interference sensing, as described below.

A received input signal 350 includes both the chirp reflections from external objects and any external radar signals received at the receiving antenna array (receiving antennae 121 and 122). During interference sensing operations 360, the processor 130 analyzes these signals to distinguish between object reflections and interference. In certain embodiments, the radar system 100 employs narrow signal beams during this period to focus on and detect external radar signals from one or more selected directions relative to the radar system. This focused detection allows the radar system 100 to identify interference sources and their characteristics, such as frequency, modulation type, and direction of arrival.

Based on the determination of external interference from one or more directional sources, the processor 130 generates new parameters for chirp transmissions from the radar system 100 via parameter adaptations 370, adapting its chirp transmission strategy for subsequent frames based on characteristics of identified external interference. In certain embodiments, the chirp transmission parameters 120 may vary between disparate directions, such as if the processor 130 determines to use one set of chirp transmission parameters to mitigate interference from a first identified interference source, and to use a different set of chirp transmission parameters to avoid a second identified interference source that is angularly separated from the first source.

After the frame period 301, the radar system 100 continues with successive frame periods (e.g., frame period 302 of the chirp pattern waveform 300), in which the processor 130 analyzes parameters of objects proximate to the radar system, identifies characteristics of signals received from external interference sources, and modifies chirp transmission parameters based on that sensed external interference, substantially in real-time.

Figure 4:
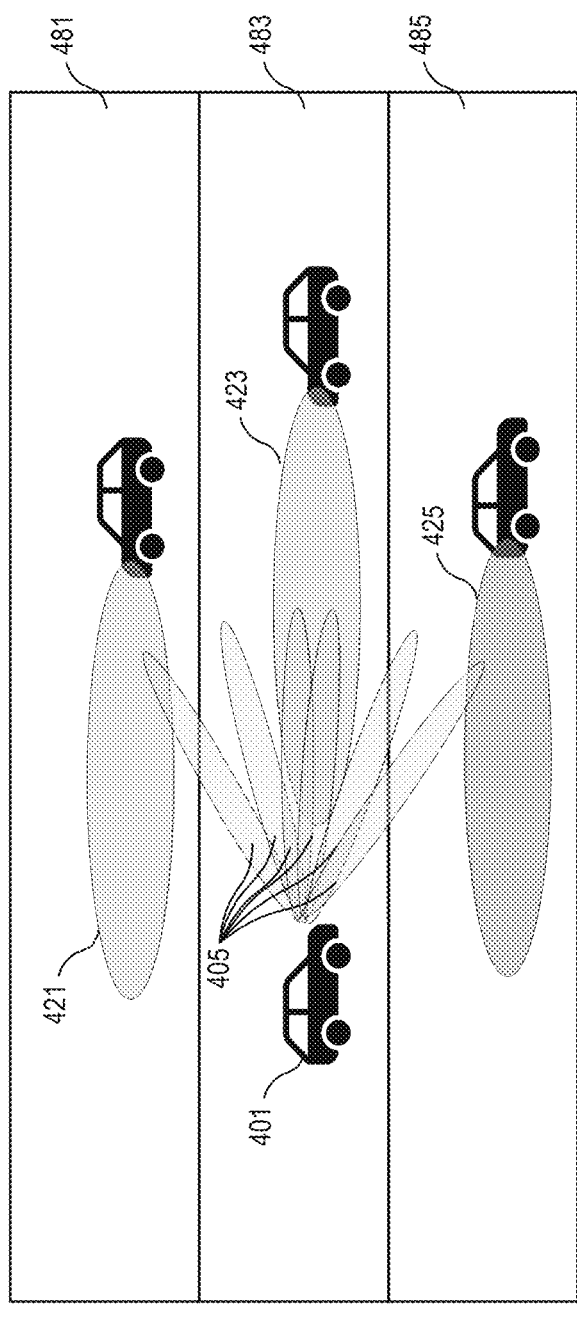
FIG. 4 illustrates a scenario in which adaptive chirp transmissions are used to mitigate interference received from other radar sources in an automotive context, in accordance with some embodiments.

FIG. 4 illustrates a scenario in which adaptive chirp transmissions are used to mitigate interference received from other radar sources in an automotive context, in accordance with some embodiments. A radar system 401, which for the illustrated example is operationally similar to the radar system 101 described elsewhere herein but housed in a moving automobile, is traveling in a center lane 483, which is adjacent to neighboring lanes 481 and 485. Each of the lanes 481, 483, 485 contains an additional vehicular radar source, potentially causing interference within their respective radar interference zones 421, 423, 425.

In the depicted scenario, radar system 401 employs its narrow sensing beams 405 to sense and adapt to interference from the other vehicular radar sources in the radar space. As the narrow sensing beams 405 sweep across the frontal angles, they detect signals that may indicate the presence of interference from other radar systems. This detection is based on the analysis of frequency, phase, and amplitude characteristics of received signals, differentiating between typical reflections from objects and specific signatures of radar interference. The narrow sensing beams 405 are directionally configured to maximize coverage and interference detection capability. The two narrow sensing beams 405 in the center lane 483, which extend into radar interference zone 423, allows the radar system 401 to detect and characterize potential interference from the oncoming car directly ahead in the same lane, while the narrow sensing beams directed into the neighboring lanes 481 and 485 function similarly with respect to the radar interference zones 421 and 425 of the vehicular radar sources in those respective lanes. Only one narrow sensing beam 405 in each pair extends into the radar interference zones 421 and 425 of cars in those lanes. This selective extension allows radar system 401 to sense interference from vehicles not directly adjacent to it, while minimizing unnecessary overlap with neighboring radar systems.

Upon detecting interference, radar system 401 dynamically adapts its chirp transmission parameters to avoid or minimize the impact of the detected interference. Moreover, as discussed elsewhere herein, the radar system 401 continuously updates its chirp transmission parameters based on real-time interference sensing. As the automobile housing radar system 401 moves, the relative positions of neighboring vehicles and the nature of their radar emissions change. The radar system adapts to these changes by continuously sweeping its narrow signal beams and adjusting its chirp parameters accordingly.

FIG. 5 illustrates an operational routine 500 for a radar system configured in accordance with some embodiments. The operational routine 500 may be performed, for example, by radar system 100 of FIG. 1 or other echolocation system configured in accordance with the techniques described herein.

The operational routine 500 begins at block 510, in which a series of chirp signals is transmitted in accordance with a first set of chirp transmission parameters during a first portion of a first transmission period. The first set of chirp transmission parameters is determined based on initial conditions and standard operational settings of the radar system, such as if no interfering external sources of radar frequency transmissions have been identified. The routine proceeds to block 520.

At block 520, the radar system enters the second portion of the first transmission period, wherein it identifies external sources of radar frequency transmissions. In certain embodiments, this identification involves analyzing the frequency, phase, and amplitude of received signals to distinguish between signals that are reflections of the system's own chirp signals and those that are from external sources.

Once external sources of radar frequency transmissions have been identified, the routine advances to block 530, in which one or more processors of the radar system generates a modified set of chirp transmission parameters based on the identified external sources. This modification is aimed at optimizing the radar's chirp transmissions to minimize the impact of interference. The adaptations might include changes in chirp frequency, duration, rate, or power level, tailored to the specific interference characteristics detected. As described in greater detail elsewhere herein, in various embodiments and scenarios such adaptations may be directionally specific, such as to provide chirp transmission parameters to mitigate interference from a first external source generating radar frequency transmissions with one set of characteristics from a first direction, and to provide separate chirp transmission parameters to mitigate interference from a second external source that is generating radar frequency transmissions with a different set of characteristics from a different second direction. The routine then proceeds to block 540.

At block 540, the radar system transmits a modified series of chirp signals in accordance with the modified set of chirp transmission parameters during a subsequent transmission period. This step reflects the radar system adjusting its operational parameters in response to the changing external radar environment. After completing this step, the routine returns to block 510.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
transmitting, during a first portion of a first transmission period, a first series of chirp signals in accordance with a first set of chirp transmission parameters;
identifying, by at least one processor and during a second portion of the first transmission period, one or more external sources of echolocation frequency transmissions from a first selected direction;
generating, by the at least one processor and based at least in part on the identifying, a modified set of chirp transmission parameters; and
transmitting, during a second transmission period subsequent to the first transmission period, a second series of chirp signals in accordance with the modified set of chirp transmission parameters.

2. The method of claim 1, wherein transmitting the first series of chirp signals comprises transmitting a first quantity of chirp signals, and wherein transmitting the second series of chirp signals comprises transmitting a second quantity of chirp signals different from the first quantity.

3. The method of claim 2, further comprising selecting the first quantity of chirp signals based on a predetermined duration of the first transmission period.

4. The method of claim 2, further comprising dynamically selecting the second quantity of chirp signals based at least in part on characteristics of the echolocation frequency transmissions from at least one of the one or more external sources.

5. The method of claim 1, wherein the modified set of chirp transmission parameters comprises one or more of a group that includes chirp frequency, chirp rate, or chirp transmission power.

6. The method of claim 1, further comprising transmitting no chirp signals during the second portion of the first transmission period.

7. The method of claim 1, wherein identifying the one or more external sources comprises identifying a first external source of echolocation frequency transmissions from the first selected direction.

8. The method of claim 7, wherein identifying the one or more external sources further comprises identifying an additional external source of echolocation frequency transmissions from an additional selected direction.

9. The method of claim 8, wherein generating the modified set of chirp transmission parameters comprises generating a first directional set of chirp transmission parameters based on characteristics of the echolocation frequency transmissions from the first external source, and generating a second directional set of chirp transmission parameters based on characteristics of the echolocation frequency transmissions from the additional external source.

10. A system, comprising:
one or more transmitting antennae to transmit, during a first portion of a first transmission period, a first series of chirp signals in accordance with a first set of chirp transmission parameters; and
one or more processors communicatively coupled to the one or more transmitting antennae, the one or more processors to, during a second portion of the first transmission period:
identify one or more external sources of echolocation frequency transmissions from a first selected direction; and
generate, based at least in part on the identification, a modified set of chirp transmission parameters;
wherein the one or more transmitting antennae are further to transmit, during a second transmission period subsequent to the first transmission period, a second series of chirp signals in accordance with the modified set of chirp transmission parameters.

11. The system of claim 10, wherein to transmit the first series of chirp signals comprises to transmit a first quantity of chirp signals, and wherein to transmit the second series of chirp signals comprises to transmit a second quantity of chirp signals different from the first quantity.

12. The system of claim 11, wherein the one or more processors are further to select the first quantity of chirp signals based on a predetermined duration of the first transmission period.

13. The system of claim 11, wherein the one or more processors are further to dynamically select the second quantity of chirp signals based at least in part on characteristics of the echolocation frequency transmissions from at least one of the one or more external sources.

14. The system of claim 10, wherein the modified set of chirp transmission parameters comprises one or more of a group that includes chirp frequency, chirp rate, or chirp transmission power.

15. The system of claim 10, wherein the one or more transmit antennae are to transmit no chirp signals during the second portion of the first transmission period.

16. The system of claim 10, wherein to identify the one or more external sources comprises identifying a first external source of echolocation frequency transmissions from the first selected direction.

17. The system of claim 16, wherein to identify the one or more external sources further comprises identifying a second external source of echolocation frequency transmissions from a second selected direction that is different than the first selected direction.

18. The system of claim 17, wherein:

to generate the modified set of chirp transmission parameters includes to generate a first directional set of chirp transmission parameters based on characteristics of the echolocation frequency transmissions from the first external source, and to generate a second directional set of chirp transmission parameters based on characteristics of the echolocation frequency transmissions from the second external source; and to transmit the second series of chirp signals in accordance with the modified set of chirp transmission parameters comprises to transmit the second series of chirp signals in accordance with the first directional set of chirp transmission parameters in the first selected direction, and to transmit the second series of chirp signals in accordance with the second directional set of chirp transmission parameters in the second selected direction.

19. The system of claim 10, further comprising a waveform generator communicatively coupled to the one or more processors and to the one or more transmit antennae, the waveform generator to generate series of chirp signals based on chirp transmission parameters provided by the one or more processors.

20. A non-transitory computer readable medium embodying a set of executable instructions, the set of executable instructions to manipulate at least one processor to:

transmit, during a first portion of a first transmission period, a first series of chirp signals in accordance with a first set of chirp transmission parameters;

identify, by at least one processor and during a second portion of the first transmission period, one or more external sources of echolocation frequency transmissions from a first selected direction;

generate, by the at least one processor and based at least in part on the identifying, a modified set of chirp transmission parameters; and transmit, during a second transmission period subsequent to the first transmission period, a second series of chirp signals in accordance with the modified set of chirp transmission parameters.

* * * * *